United States Patent
Strijker et al.

(10) Patent No.: US 11,588,407 B2
(45) Date of Patent: Feb. 21, 2023

(54) SWITCHED MODE POWER SUPPLY

(71) Applicant: NXP B.V., Eindhoven (NL)

(72) Inventors: Joan Wichard Strijker, Wijchen (NL); Peter Theodorus Johannes Degen, Arnhem (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 17/021,143

(22) Filed: Sep. 15, 2020

(65) Prior Publication Data

US 2022/0085724 A1 Mar. 17, 2022

(51) Int. Cl.
*H02M 3/335* (2006.01)
*H02M 1/42* (2007.01)

(52) U.S. Cl.
CPC ..... *H02M 3/33569* (2013.01); *H02M 1/4225* (2013.01)

(58) Field of Classification Search
CPC .. H02M 3/335; H02M 3/33569; H02M 1/007; H02M 1/4241; H02M 1/0006; H02M 3/01; H02M 1/42
See application file for complete search history.

(56) References Cited

U.S. PATENT DOCUMENTS

| | | | | |
|---|---|---|---|---|
| 8,194,417 | B2 * | 6/2012 | Chang | H02M 3/28 363/16 |
| 8,742,674 | B2 * | 6/2014 | Shteynberg | H05B 45/3575 315/308 |
| 10,534,029 | B1 * | 1/2020 | Tsai | H02M 3/33569 |
| 2006/0146584 | A1 * | 7/2006 | Aso | H02M 3/33507 363/95 |
| 2013/0027983 | A1 | 1/2013 | Nate et al. | |
| 2013/0328493 | A1 * | 12/2013 | Munday | H05B 45/375 315/201 |

FOREIGN PATENT DOCUMENTS

CN 109802475 A 5/2019
DE 10 2015 223 546 A1 6/2017

OTHER PUBLICATIONS

E2E; "no title"; retrieved from the internet https://e2e.ti.com/support/power-management/f/196/t/531970?elegant-solution-for-discharging-the-main-capacitor-when-power-is-cut-off on Aug. 9, 2020; 1 page.
Milne, Ian; Diodes Inc; "AN1140 Rev.2—Active Capacitor Discharge Circuit Considerations for FPGAs"; 9 pages (Oct. 2015).
NXP; AN11801-TEA19161 and TEA19162 Controller Ics—Revision 2, Application Note; 140 pages (Jan. 2019).
"TM PFC with X-cap discharge and LLC resonant combo controller—STCMB1", Stimicroelectronics, 59 pgs., retrieved from the internet at: https://www.st.com/resource/en/datasheet/stcmbl.pdf (Jan. 2018).

* cited by examiner

Primary Examiner — Gary L Laxton

(57) ABSTRACT

One example discloses a switched mode power supply device, comprising: an energy storage device; a controller configured to discharge the energy storage device; a voltage drop device having a first pin coupled to the energy storage device, a second pin coupled to the controller, and a third pin coupled to receive a first power-down signal; wherein the first power-down signal indicates that the energy storage device is to be discharged; wherein the voltage drop device is configured to input a first voltage from the energy storage device on the first pin and output a second voltage to the controller on the second pin; and wherein the second voltage is lower than the first voltage.

20 Claims, 7 Drawing Sheets

SWITCHED MODE POWER SUPPLY

The present specification relates to systems, methods, apparatuses, devices, articles of manufacture and instructions for switched mode power supplies.

SUMMARY

According to an example embodiment, a switched mode power supply device, comprising: an energy storage device; a controller configured to discharge the energy storage device; a voltage drop device having a first pin coupled to the energy storage device, a second pin coupled to the controller, and a third pin coupled to receive a first power-down signal; wherein the first power-down signal indicates that the energy storage device is to be discharged; wherein the voltage drop device is configured to input a first voltage from the energy storage device on the first pin and output a second voltage to the controller on the second pin; and wherein the second voltage is lower than the first voltage.

In another example embodiment, the energy storage device is a high-voltage capacitor.

In another example embodiment, the voltage drop device includes a transistor.

In another example embodiment, the transistor is a MOSFET transistor and the first pin is a drain, the second pin is a source and the third pin is a gate.

In another example embodiment, the transistor is a bipolar transistor and the first pin is an emitter, the second pin a collector and the third pin is a base.

In another example embodiment, the voltage drop device includes a MOSFET transistor, a resistor, and a Zener diode; the transistor is coupled between the energy storage device and the controller by a source and a drain of the transistor; the third pin is a gate of the transistor; the resistor is coupled between the energy storage device and the gate of the transistor; and the Zener diode is coupled between the gate of the transistor and a reference potential.

In another example embodiment, the reference potential is a ground potential for the switched mode power supply device.

In another example embodiment, a fixed reference voltage is received from the resistor and Zener diode.

In another example embodiment, the second voltage output by the voltage drop device to the controller is set by a Zener voltage of the Zener diode minus a threshold conduction voltage of the MOSFET transistor.

In another example embodiment, the controller is configured to receive a supply voltage; and the supply voltage is larger than the Zener voltage minus the threshold conduction voltage of the MOSFET transistor.

In another example embodiment, the controller is configured to receive a supply voltage; and the fixed reference voltage at the gate is set such that the MOSFET transistor conducts current when the supply drops below a minimum level.

In another example embodiment, the supply voltage is lowered by an internal current source which is enabled when the energy storage device is to be discharged.

In another example embodiment, further comprising an LLC resonant circuit having a high-side transistor and a low-side transistor; wherein a first pin of the high-side transistor is coupled to the energy storage device and a second pin of the high-side transistor is coupled to a first pin of the low-side transistor; wherein a second pin of the low-side transistor is coupled to a reference potential; and wherein the controller is coupled to a control pin of the high-side transistor and a control pin of the low-side transistor.

In another example embodiment, the voltage drop device includes a MOSFET transistor, a diode, and a capacitor; the transistor is coupled between the energy storage device and the controller by a source and a drain of the transistor; the third pin coupled to receive the first power-down signal is coupled to a gate of the transistor; the diode is coupled between the control pin of the low-side transistor and the gate of the MOSFET transistor; and the Zener diode is coupled between the gate of the MOSFET transistor and a reference potential.

In another example embodiment, the first power-down signal is received from the diode and capacitor.

In another example embodiment, the second voltage output by the voltage drop device to the controller is set by a voltage on the capacitor minus a threshold conduction voltage of the MOSFET transistor.

In another example embodiment, the controller is configured to receive a supply voltage; and the supply voltage is larger than the voltage on the capacitor minus the threshold conduction voltage of the MOSFET transistor.

In another example embodiment, the capacitor is configured to be charged by a switching signal received from the control pin of the low-side transistor.

In another example embodiment, the controller includes a discharge current regulator; and the voltage drop device is coupled between the energy storage device and the discharge current regulator in the controller.

In another example embodiment, the discharge current regulator is configured to receive a second power-down signal and in response pass a discharge current from the energy storage device and the voltage drop device to a ground potential of the switched mode power supply device.

In another example embodiment, the first power-down signal and the second power-down signal are different signals.

In another example embodiment, the switched mode power supply device is configured to transform an AC mains voltage to a DC output voltage; the energy storage capacitor is included in a power factor correction (PFC) circuit; the power factor correction (PFC) circuit is configured to transform an AC mains voltage to a high-voltage on the energy storage capacitor; and further comprising a LLC resonant circuit configured to transform the high-voltage on the energy storage capacitor to the DC output voltage.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
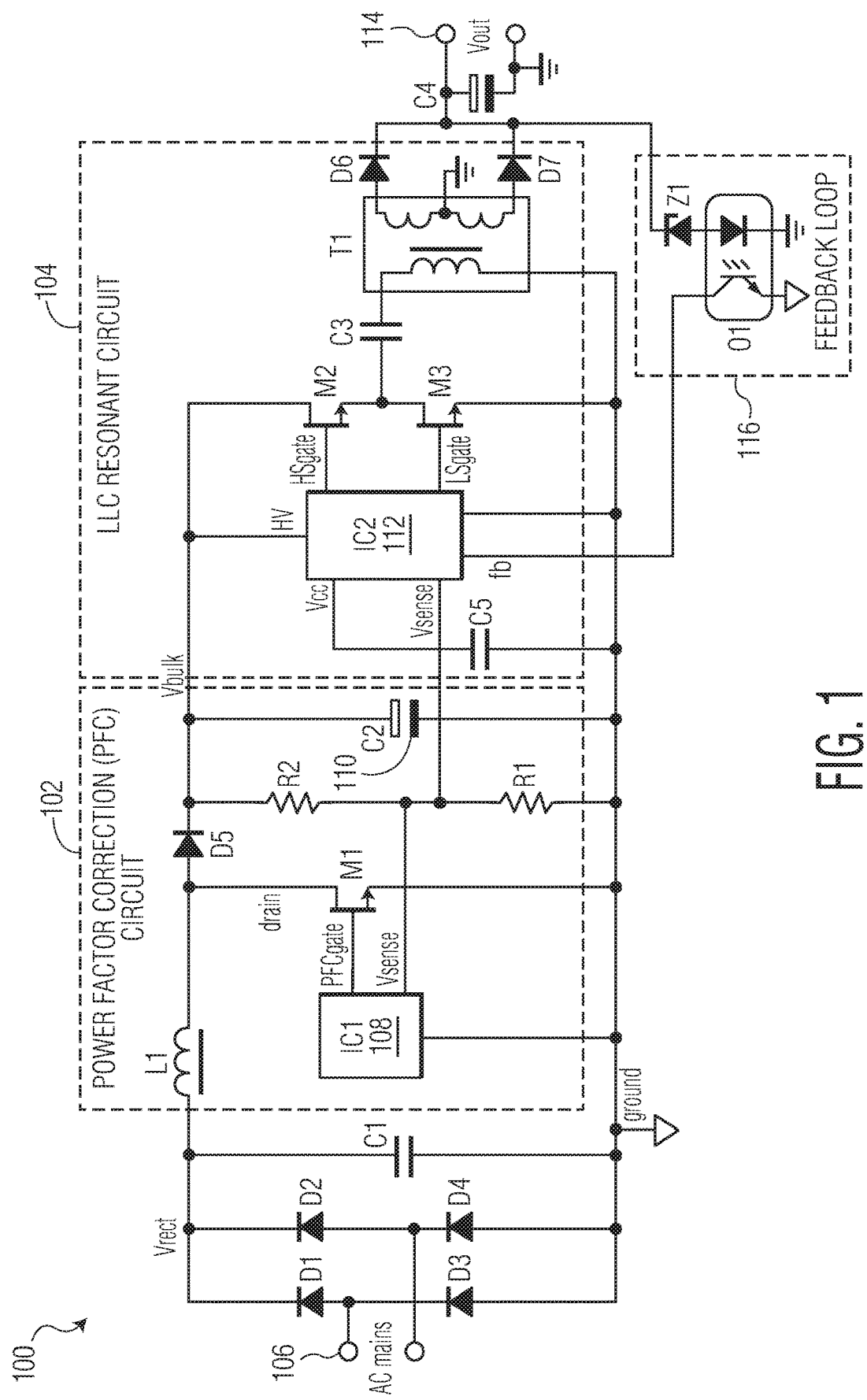
FIG. 1 is an example of a first switched mode power supply.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

In a Switched Mode Power Supply (SMPS) having a high-voltage energy storage device (e.g. a capacitor) it is, for safety reasons, advantageous to discharge the high-voltage energy storage device after an application (e.g. a device to be powered by the SMPS) switches off. In some example designs, the SMPS must include a special high-voltage capable integrated circuit (IC) controller which will not be damaged during the discharge process. Simplified and/or lower cost IC controllers could be damaged during the discharge process.

FIG. 1 is an example of a first switched mode power supply (SMPS) 100. The SMPS 100 includes a power factor correction (PFC) circuit 102 and an LLC resonant circuit 104. The AC mains input voltage 106 is rectified by rectifier bridge diodes D1, D2, D3 and D4.

The PFC circuit 102 includes inductor L1, diode D5, transistor M1, an energy storage capacitor (C2) 110, and power factor controller (IC1) 108. The PFC circuit 102 is a boost type converter, boosting a rectified voltage (Vrect) to a high-voltage (Vbulk). A resistive divider (e.g. R1 and R2) provides a Vsense voltage for monitoring the high-voltage (HV/Vbulk) on the energy storage capacitor 110. The PFC controller (IC1) 108, uses Vsense to regulate the voltage Vbulk.

The LLC resonant circuit 104 includes a first LLC controller (IC2) 112, a high-side (HS) transistor (M2), a low-side (LS) transistor (M3), capacitors C3 and C4, transformer T1, and diodes D6 and D7. The LLC resonant circuit 104 converts the Vbulk voltage to a SMPS output voltage (Vout) 114. The LLC resonant circuit 104 also uses Vsense from the resistive divider (e.g. R1 and R2) to sense the high-voltage (HV/Vbulk).

Also included is a feedback loop 116 consisting of Z1 and opto-coupler O1.

Figure 2:
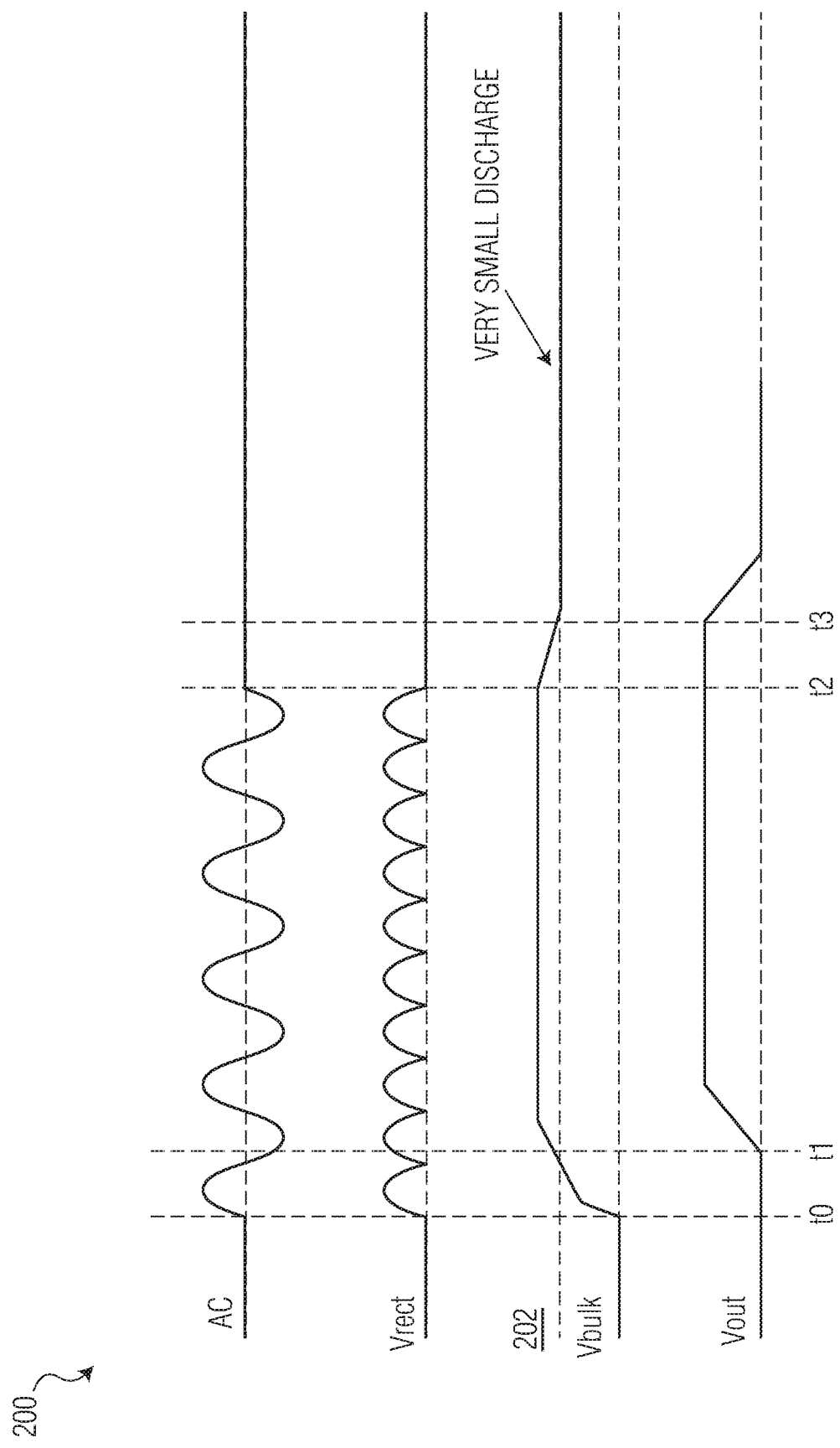
FIG. 2 is an example timing diagram of the first switched mode power supply.

FIG. 2 is an example timing diagram 200 of the first switched mode power supply 100 in operation. After voltage is applied at the AC mains 106 (e.g. is plugged in) at t=t0, the PFC circuit 102 starts and the Vbulk will rise. When Vbulk reaches a lower threshold level 202 at t=t1, the LLC circuit 104 starts operating and the output voltage 114 will rise. The output voltage 114 is regulated through the feedback loop 116.

When the voltage is removed from the AC mains 106 (e.g. is unplugged) at t=t2, the PFC circuit 102 cannot provide power to the LLC circuit 104 and the Vbulk voltage will drop. As soon as the Vbulk voltage has dropped below the lower level 202 at t=t3, the LLC resonant circuit 104 stops operating.

As no more power is drawn from the energy storage capacitor (C2) 110, except for a very small current drawn by R1, R2, the Vbulk voltage on the capacitor 110 will remain at a high-voltage (e.g. "very small discharge" region). If, for example the capacitance of the energy storage capacitor 110 is 250 uF and the resistance of R1+R2 is 10 mega-ohm, the RC constant is 2500 seconds and it will take several hours to discharge the energy storage capacitor 110 from perhaps 300V to a safe voltage of e.g. 10V. For production testing of the power supply and repair, this could create a hazardous situation.

Figure 3:
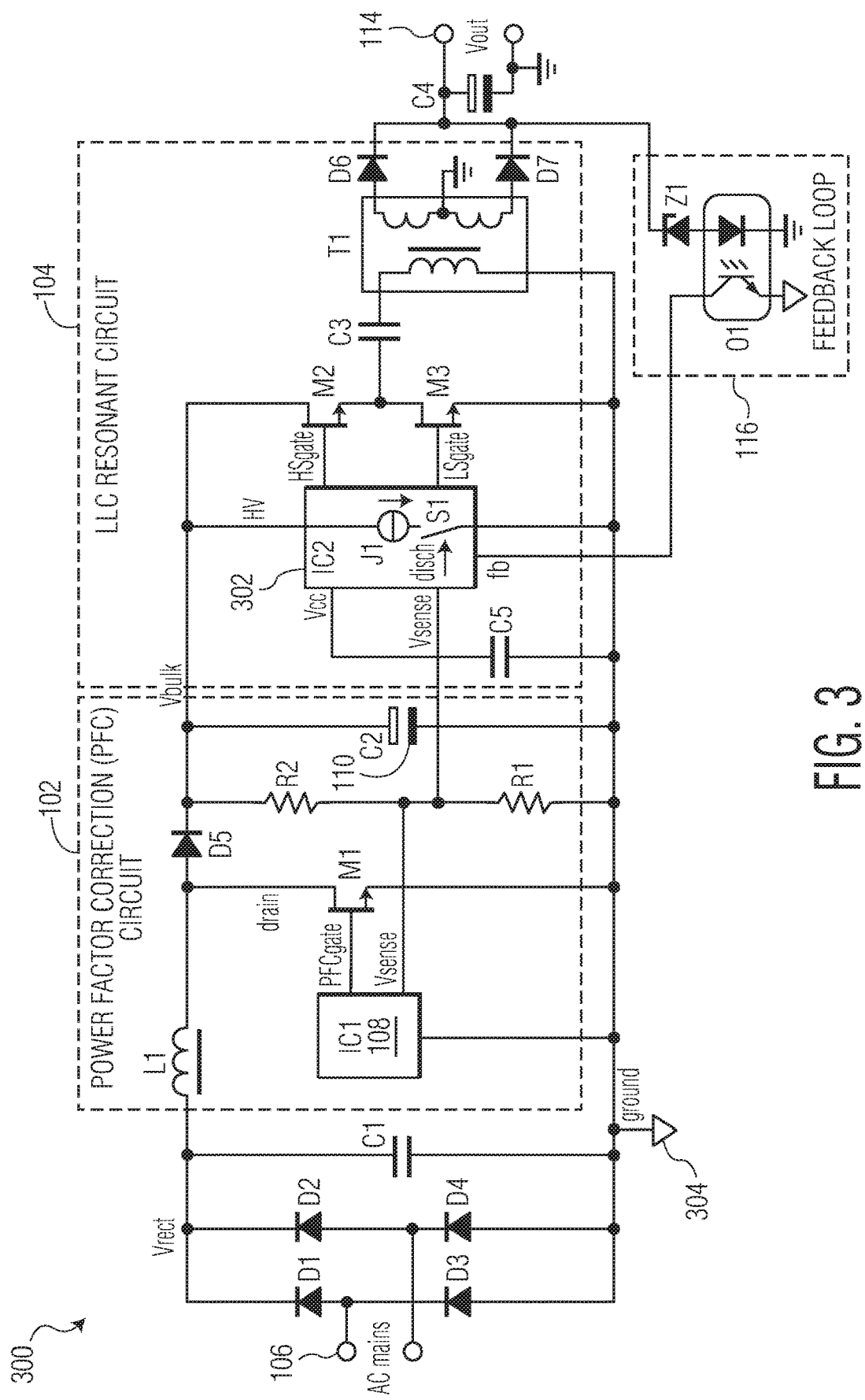
FIG. 3 is an example of a second switched mode power supply.

FIG. 3 is an example of a second switched mode power supply (SMPS) 300. The second SMPS 300 includes the elements of the first SMPS 100 except that the first LLC controller (IC2) 112 has been replaced with a second LLC controller (IC2) 302.

The second LLC controller (IC2) 302 includes a discharge current regulator (J1) and a switch (S1) coupled to a ground 304.

Figure 4:
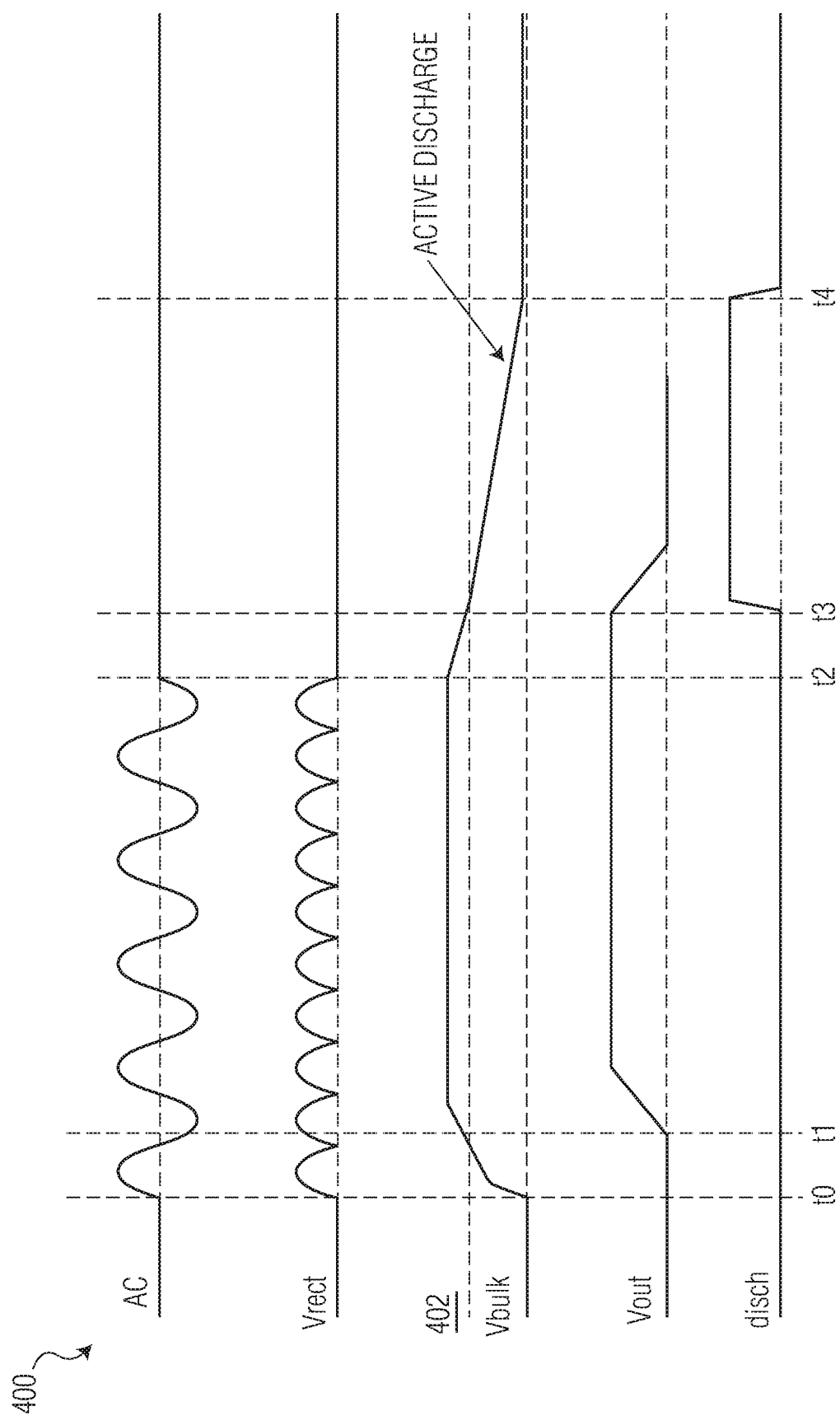
FIG. 4 is an example timing diagram of the second switched mode power supply.

FIG. 4 is an example timing diagram 400 of the second switched mode power supply 300. After voltage is applied at the AC mains 106 (e.g. is plugged in) at t=t0, the PFC circuit 102 starts and the Vbulk will rise. When Vbulk reaches a lower threshold level 402 at t=t1, the LLC circuit 104 starts operating and the output voltage 114 will rise. The output voltage 114 is regulated through the feedback loop 116.

When the voltage is removed from the AC mains 106 (e.g. is unplugged) at t=t2, the PFC circuit 102 cannot provide power to the LLC circuit 104 and the Vbulk voltage will drop. As soon as the Vbulk voltage has dropped below the lower level 402 at t=t3, the LLC resonant circuit 104 stops operating.

However, with the second LLC controller (IC2) 302, as soon as the LLC converter 104 stops operating, the switch S1 is closed by a discharge (disch) signal (active between times T3 and t4) and the discharge current regulator (J1) discharges the capacitor 110 (e.g. "active discharge" region) to a low, safe voltage level. For example, if the discharge current is regulated to 8 mA, then a 250 uF energy storage capacitor 110 could be discharged from 300V to <10V within 10 seconds.

An 8 mA discharge current at 300V is relatively large. In the above example an initial power dissipation at 300V and 8 mA is 2.4 W, while an average power dissipation during the 10 second discharge is 1.2 W. Such power dissipation levels would require that the second LLC controller (IC2) 302 be a large high-voltage capable integrated circuit (IC) controller which would not be damaged during the discharge process. Smaller packaged IC controllers however could be damaged during the discharge process.

Figure 5:
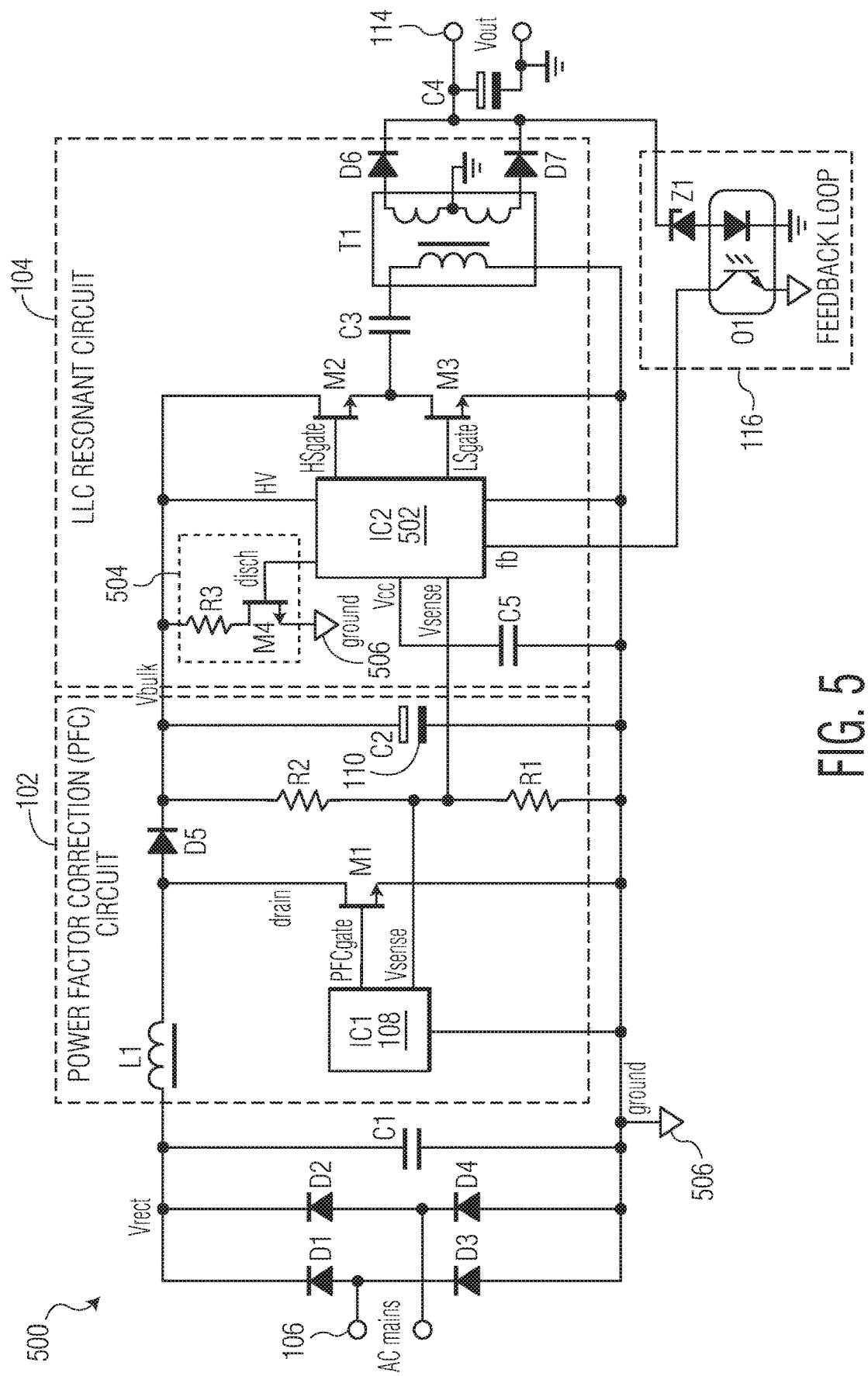
FIG. 5 is an example of a third switched mode power supply.

FIG. 5 is an example of a third switched mode power supply (SMPS) 500. The third SMPS 500 includes the elements of the first SMPS 100 except that the first LLC controller (IC2) 112 has been replaced with a third LLC controller (IC2) 502 and an external switching element 504 has been added.

The third LLC controller (IC2) 502 now includes dedicated discharge (disch) pin. The external switching element 504 includes a MOSFET (M4) coupled to the discharge (disch) pin and ground 506. A resistor R3 is coupled between M4 and the energy storage capacitor (C2) 110.

In this example 500, as soon as the LLC converter 104 stops operating, third LLC controller (IC2) 502 activates the discharge (disch) pin, thereby switching M4 on and discharging the energy storage capacitor 110 through resistor R3.

In this example 500, an additional (disch) pin from the third LLC controller (IC2) 502 is required. Another option would be to discharge the capacitor (C2) via the resonant converter by switching at a high frequency, but this will send power to the output voltage (Vout) 114 and if this power is not consumed, the output voltage 114 could rise above a maximum design/allowable value.

Now discussed are example embodiments of SMPSs that include circuits for discharging energy storage devices in the SMPS, but which also do not route excess power through LLC controller ICs and do not require that the LLC controller include an additional pin.

Figure 6:
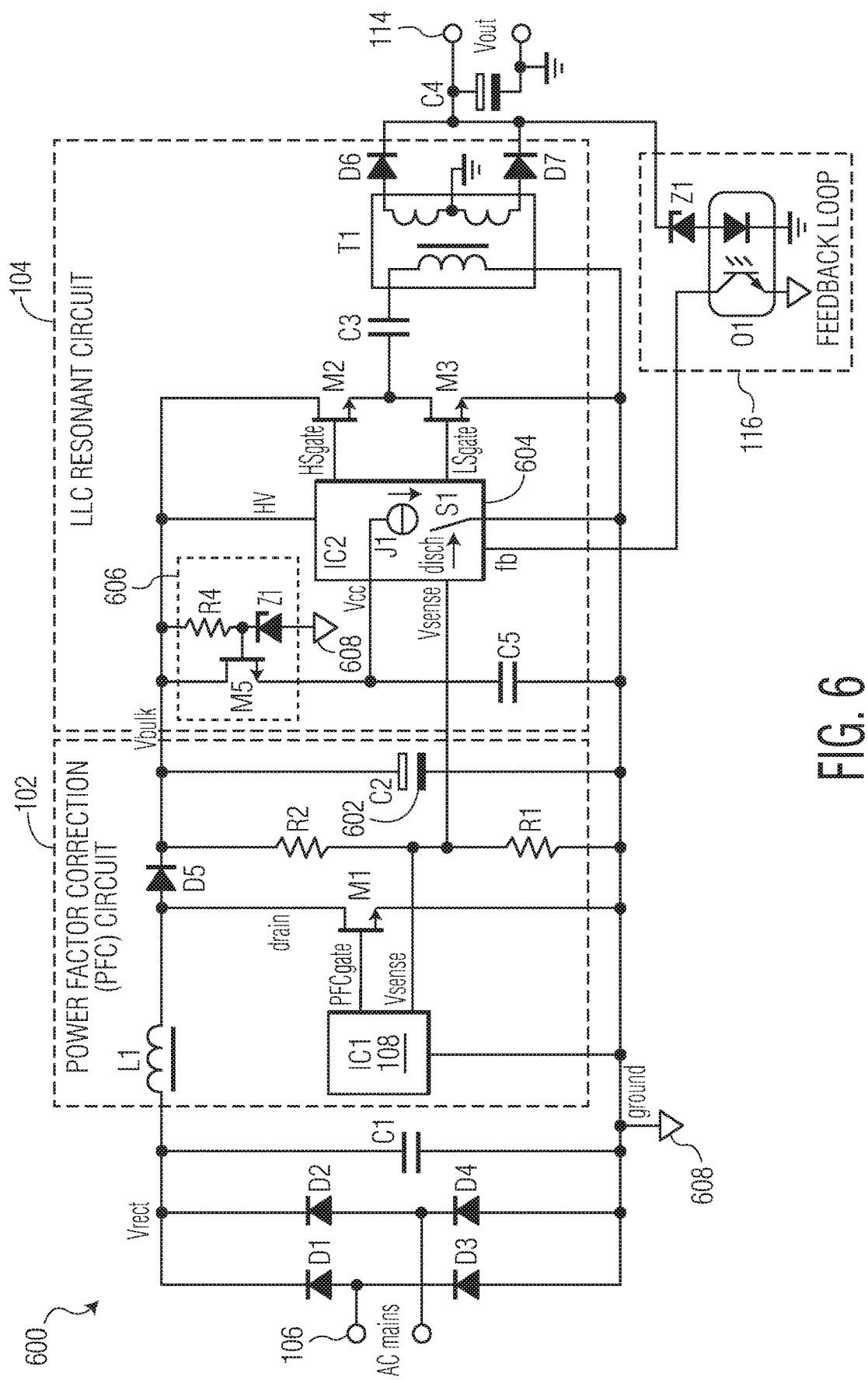
FIG. 6 is an example of a fourth switched mode power supply.

FIG. 6 is an example of a fourth switched mode power supply (SMPS) 600. The fourth SMPS 600 includes the elements of the first SMPS 100, and the first LLC controller (IC2) 112 has been replaced with a fourth LLC controller (IC2) 604 to which a first voltage drop device 606 has been added.

The energy storage device 602 is herein defined as any device which stores energy. In some example embodiments the energy storage device 602 could be a capacitor.

The fourth LLC controller (IC2) 604 includes a discharge current regulator (J1) and a switch (S1) coupled to a reference potential 608. In some example embodiments the reference potential 608 is a ground potential.

The first voltage drop device 606 includes a transistor M5, a resistance R4 and a Zener diode (Z1). The transistor M5 is coupled between the energy storage device 602 and the discharge current regulator (J1) in the fourth LLC controller (IC2) 604. The resistor R4 is coupled between the energy storage device 602 and a control pin of the transistor M5. The Zener diode (Z1) is coupled between the control pin of the transistor M5 and the reference potential 608.

Referring to FIG. 4, during the discharge period (e.g. from times t3 to t4) when the discharge (disch) signal closes switch S1 and the discharge current regulator (J1) is switched on, the first voltage drop device 606 limits a voltage received by the discharge current regulator (J1) in the fourth LLC controller (IC2) 604.

The first voltage drop device 606 limits the voltage received by the discharge current regulator (J1) since the voltage on the Vcc input pin of the fourth LLC controller (IC2) 604 is limited to the Zener (Z1) voltage minus the transistor's M5 threshold turn-on voltage.

For example, if the Zener voltage is 10V and the threshold voltage is 2V, the voltage output by the transistor M5 received on the Vcc input pin by the discharge current regulator (J1) is limited to only 8V during the discharge even if the voltage on the energy storage device 602 is 300V. As a result, the power dissipation in the fourth LLC controller (IC2) 604 is limited to 8V*8 mA=64 mW. The transistor M5 is chosen large enough to handle the energy storage device 602 power dissipation (e.g. (300V−8V)*8 mA=2.3 W).

The supply voltage (Vcc) is set to larger than the Zener (Z1) voltage minus the threshold voltage of transistor M5 (e.g. Vcc>8V), such that during normal operation M5 does not conduct current. For example during normal operation of the SMPS 600, the gate-source voltage Vgs of transistor M5 is lower than its threshold voltage.

Discharge of the energy storage device 602 continues until the fourth LLC controller's (IC2) 604 supply voltage Vcc drops below a minimum operation level to assure that J1 and S1 operate properly. This minimum operation level is well below the start-up and minimal operation level of the fourth LLC controller's (IC2) 604 to assure that the LLC converter (104) operates properly. No additional pin, such as shown in FIG. 5, is needed on the fourth LLC controller's (IC2) 604.

Figure 7:
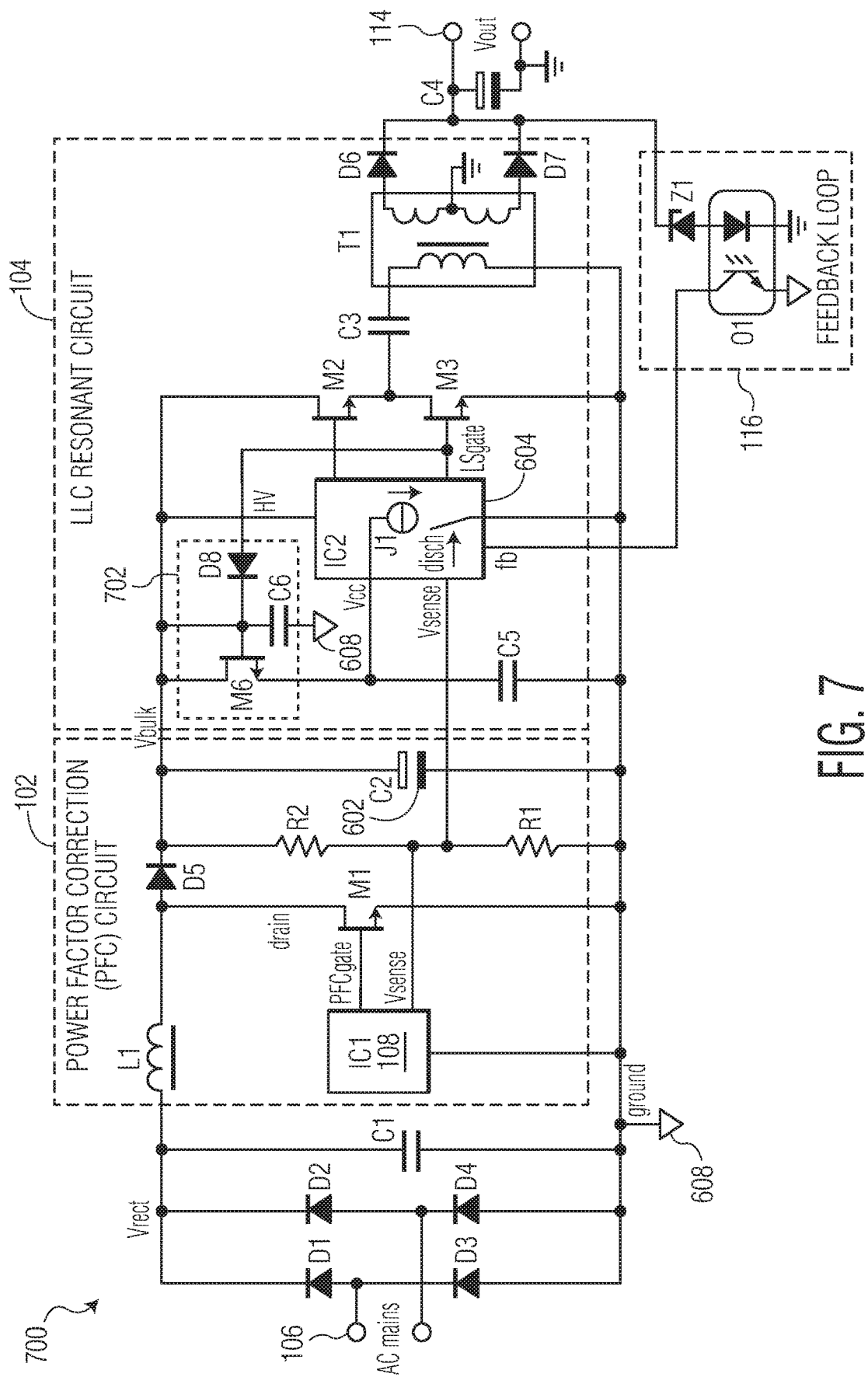
FIG. 7 is an example of a fifth switched mode power supply.

FIG. 7 is an example of a fifth switched mode power supply (SNIPS) 700. The fifth SNIPS 700 includes the elements of the fourth SNIPS 600 except that the first voltage drop device 606 has been replaced with a second voltage drop device 702.

The second voltage drop device 702 includes a transistor M6, diode D8, and capacitor C6. The transistor M6 is coupled between the energy storage device 602 and the discharge current regulator (J1) in the fourth LLC controller (IC2) 604. The diode D8 is coupled between a low-side (LS) gate M3 of the LLC resonant circuit 104 and a control pin of the transistor M6. The capacitor C6 is coupled between the control pin of the transistor M6 and the reference potential 608.

During SNIPS 700 operation, the LS gate M3 signal is switching. This charges capacitor C6 through diode D8. In an example embodiment, the LS gate voltage is about 10V and as soon as the SMPS 700 stops switching, the control pin of the transistor M6 (e.g. M6 gate voltage) remains charged by the energy stored in C6, then minus an example 2V Vgs threshold voltage of M6, 8V is received on the Vcc input pin by the discharge current regulator (J1) and the energy storage device 602 is discharged with little power dissipation in the fourth LLC controller (IC2) 604.

The supply voltage (Vcc) is set to larger than the capacitor C6 voltage minus the threshold voltage of transistor M6 (e.g. Vcc>8V), such that during normal operation M6 does not conduct current.

An advantage of the SMPS 700 design is that no additional power is dissipated during normal operation. For example, in the SMPS 600 of FIG. 6, resistor R4 will dissipate some power during normal operation. For example, if the resistance of R4 is 5 mega-ohm, more than 30 mW is dissipated in operation when the Vbulk voltage is 400V. However, no-load operation power for the SMPS 700 of FIG. 7 will be lower. As before, no additional pin, such as shown in FIG. 5, is needed on the fourth LLC controller's (IC2) 604.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A switched mode power supply device, comprising:
an energy storage device;
a controller configured to discharge the energy storage device;
a voltage drop device having a first pin coupled to the energy storage device, a second pin coupled to the controller, and a third pin coupled to receive a power-down signal;
wherein the power-down signal indicates that the energy storage device is to be discharged;
wherein the voltage drop device is configured to input a first voltage from the energy storage device on the first pin and output a second voltage to the controller on the second pin;
wherein the second voltage is lower than the first voltage;
wherein the voltage drop device includes a MOSFET transistor, a resistor, and a Zener diode;
wherein the transistor is coupled between the energy storage device and the controller by a source and a drain of the transistor;
wherein the third pin is a gate of the transistor coupled to receive the power-down signal;
wherein the resistor is coupled between the energy storage device and the gate of the transistor;
wherein the Zener diode is coupled between the gate of the transistor and a reference potential;
wherein the controller includes a discharge current regulator; and
wherein the voltage drop device is coupled between the energy storage device and the discharge current regulator in the controller.

2. The device of claim 1:
wherein the energy storage device is a high-voltage capacitor.

3. The device of claim 1:
wherein the voltage drop device includes a transistor.

4. The device of claim 3:
wherein the transistor is a MOSFET transistor and the first pin is a drain, the second pin is a source and the third pin is a gate.

5. The device of claim 3:
wherein the transistor is a bipolar transistor and the first pin is an emitter, the second pin a collector and the third pin is a base.

6. The device of claim 1:
wherein the reference potential is a ground potential for the switched mode power supply device.

7. The device of claim 1:
wherein the power-down signal is received from a node coupling the resistor to the Zener diode.

8. The device of claim 7:
wherein the second voltage output by the MOSFET transistor in the voltage drop device to the controller is equal to a Zener voltage of the Zener diode minus a threshold conduction voltage of the MOSFET transistor.

9. The device of claim 8:
wherein the controller is configured to receive a supply voltage; and
wherein the supply voltage is larger than the Zener voltage minus the threshold conduction voltage of the MOSFET transistor.

10. The device of claim 8:
wherein the controller is configured to receive a supply voltage at a supply voltage pin; and
wherein the second pin of the voltage drop device is coupled to the supply voltage pin of the controller.

11. The device of claim 1:
wherein the discharge current regulator is coupled to a switch; and
wherein the controller is configured to receive a discharge signal when the energy storage device is to be discharged; and
wherein the controller is configured to close the switch in response to the discharge signal, enabling current received from the energy storage device to flow through the discharge current regulator.

12. The device of claim 1:
wherein the switched mode power supply device is configured to transform an AC mains voltage to a DC output voltage;
wherein the energy storage capacitor is included in a power factor correction (PFC) circuit;

wherein the power factor correction (PFC) circuit is configured to transform an AC mains voltage to a high-voltage on the energy storage capacitor; and
further comprising a LLC resonant circuit configured to transform the high-voltage on the energy storage capacitor to the DC output voltage.

13. A switched mode power supply device, comprising:
an energy storage device;
a controller configured to discharge the energy storage device;
a voltage drop device having a first pin coupled to the energy storage device, a second pin coupled to the controller, and a third pin coupled to receive a power-down signal;
wherein the power-down signal indicates that the energy storage device is to be discharged;
wherein the voltage drop device is configured to input a first voltage from the energy storage device on the first pin and output a second voltage to the controller on the second pin; and
wherein the second voltage is lower than the first voltage;
an LLC resonant circuit having a high-side transistor and a low-side transistor;
wherein a first pin of the high-side transistor is coupled to the energy storage device and a second pin of the high-side transistor is coupled to a first pin of the low-side transistor;
wherein a second pin of the low-side transistor is coupled to a reference potential; and
wherein the controller is coupled to a control pin of the high-side transistor and a control pin of the low-side transistor;
wherein the voltage drop device includes a MOSFET transistor, a diode, and a capacitor;
wherein the MOSFET transistor is coupled between the energy storage device and the controller by a source and a drain of the MOSFET transistor;
wherein the third pin coupled to receive the power-down signal is coupled to a gate of the MOSFET transistor;
wherein the diode is coupled between the control pin of the low-side transistor and the gate of the MOSFET transistor; and
wherein the capacitor is coupled between the gate of the MOSFET transistor and a reference potential.

14. The device of claim 13:
wherein the power-down signal is received from a node coupling the diode and capacitor.

15. The device of claim 14:
wherein the second voltage output by the voltage drop device to the controller is set by a voltage on the capacitor minus a threshold conduction voltage of the MOSFET transistor.

16. The device of claim 14:
wherein the controller is configured to receive a supply voltage; and wherein the supply voltage is larger than the voltage on the capacitor minus the threshold conduction voltage of the MOSFET transistor.

17. The device of claim 14:
wherein the capacitor is configured to be charged by a switching signal received from the control pin of the low-side transistor.

18. The device of claim 17:
wherein the power-down signal is a first power-down signal; and
wherein the discharge current regulator is configured to receive a second power-down signal and in response pass a discharge current from the energy storage device and the voltage drop device to a ground potential of the switched mode power supply device.

19. The device of claim 18:
wherein the first power-down signal and the second power-down signal are different signals.

20. A switched mode power supply device, comprising:
an energy storage device;
a controller configured to discharge the energy storage device;
a voltage drop device having a first pin coupled to the energy storage device, a second pin coupled to the controller, and a third pin coupled to receive a power-down signal;
wherein the power-down signal indicates that the energy storage device is to be discharged;
wherein the voltage drop device is configured to input a first voltage from the energy storage device on the first pin and output a second voltage to the controller on the second pin;
wherein the second voltage is lower than the first voltage;
wherein the voltage drop device includes a MOSFET transistor, a resistor, and a Zener diode;
wherein the transistor is coupled between the energy storage device and the controller by a source and a drain of the transistor;
wherein the third pin is a gate of the transistor coupled to receive the power-down signal;
wherein the resistor is coupled between the energy storage device and the gate of the transistor;
wherein the Zener diode is coupled between the gate of the transistor and a reference potential;
wherein the controller includes a discharge current regulator coupled to a switch; and
wherein the controller is configured to receive a discharge signal when the energy storage device is to be discharged; and
wherein the controller is configured to close the switch in response to the discharge signal, enabling current received from the energy storage device to flow through the discharge current regulator.

* * * * *